United States Patent [19]

Fujioka et al.

[11] 4,311,931
[45] Jan. 19, 1982

[54] ROTOR FOR HYDROGEN-COOLED ROTARY ELECTRIC MACHINES

[75] Inventors: Kazumasa Fujioka, Ibaraki; Wataru Nakayama, Kashiwa, both of Japan

[73] Assignee: Hitachi, Ltd., Tokyo, Japan

[21] Appl. No.: 86,683

[22] Filed: Oct. 19, 1979

[30] Foreign Application Priority Data

Oct. 27, 1978 [JP] Japan .................. 53-131659

[51] Int. Cl.³ .............................................. H02K 9/00
[52] U.S. Cl. ......................................... 310/55; 310/61
[58] Field of Search ................. 310/52, 55, 58, 61, 310/65, 270

[56] References Cited

U.S. PATENT DOCUMENTS

| | | | |
|---|---|---|---|
| 2,786,951 | 3/1957 | Morgan | 310/61 |
| 3,005,119 | 10/1961 | Schmitt et al. | 310/61 |
| 3,225,231 | 12/1965 | Kudlacik | 310/55 X |

FOREIGN PATENT DOCUMENTS

| | | |
|---|---|---|
| 41-13042 | 7/1966 | Japan . |
| 52-27504 | 3/1977 | Japan .................. 310/55 |
| 53-17725 | 6/1978 | Japan . |

*Primary Examiner*—Mark O. Budd
*Attorney, Agent, or Firm*—Craig and Antonelli

[57] ABSTRACT

A rotor for hydrogen-cooled rotary electric machines is provided with a gas inlet chamber and a gas outlet chamber which are circumferentially defined by radially extending partition walls and disposed in a region between a retaining ring holding rotor windings in position and a rotor shaft. Rotor cooling gas is introduced through a gas inlet port to a gas inlet chamber to flow to a gas outlet chamber divided into a plurality of zones while cooling the rotor windings. Form the gas outlet chamber, the gas flows through axially extending passages to a plurality of fan-like ventilating means to be discharged outside of the rotor.

4 Claims, 6 Drawing Figures

4,311,931

ROTOR FOR HYDROGEN-COOLED ROTARY ELECTRIC MACHINES

BACKGROUND OF THE INVENTION

1. Field of the Invention

This invention relates to a rotor for hydrogen-cooled rotary electric machines wherein the rotor is cooled by hydrogen gas.

2. Description of the Prior Art

In rotary electric machines such as a hydrogen-cooled rotary electric machine, the following limitations are generally placed on the provision of passages for the gas for cooling the windings at the end of the rotor. A retaining ring for holding the windings in a predetermined position develops stress of high magnitude and it is not desirable to form gas flow passages in the retaining ring. This makes it inevitable to permit the gas to be introduced into and discharged from the windings through an annular surface disposed outside the end surface of the retaining ring and restricted by the rotor shaft. Moreover, the area that can be used for forming the gas inlet and outlet passages is further restricted and becomes essentially smaller than the area of the annular surface because of the fact that laminated windings occupy the major part of the zone between the retaining ring and rotor shaft and a center ring for axially supporting the laminated windings is located beneath the retaining ring. It has hitherto been one of the most important problems in the technology of cooling the windings at the end of the rotor how to provide inlet and outlet ports for the cooling gas under these circumstances.

Proposals have hitherto been made, as disclosed in Japanese Patent Publication No. 17725/78, to form grooves in the rotor shaft to increase the area of the gas inlet port for introducing gas into a gas inlet chamber, and to divide a gas outlet chamber near the polar axis into a first zone near the center ring and a second zone away therefrom, with two separate fan-like ventilating means each communicating with one of the two zones of the outlet chamber for release of the gas to the outside.

SUMMARY OF THE INVENTION

It is an object of the present invention to provide a rotor for hydrogen-cooled rotary electric machines capable of achieving effectively uniform cooling of the windings about the end of the rotor by providing gas discharge passages of small flow resistance and by increasing the heat dissipating area on the outer surfaces of the windings.

According to the present invention, there is provided a rotor for hydrogen-cooled rotary electric machines in which circumferentially disposed partition walls underlying the lowermost layer of windings at an arbitrarily selected point of laminated windings, a first zone of a gas outlet chamber defined by the circumferentially disposed partition wall and an L-shaped insulating spacer, and first fan-like ventilating means communicating with the first zone of the gas outlet chamber through a space underlying the lowermost layer of windings forming gas discharge passages whereby the resistance offered to the passage of the gas can be minimized. The provision of the circumferentially disposed partition walls underlying the lowermost layer of windings of the laminated windings has the effect of promoting heat dissipation through the outer surfaces of the windings, thereby enabling uniform cooling of the laminated windings.

DESCRIPTION OF THE PREFERRED EMBODIMENT

Figure 1:
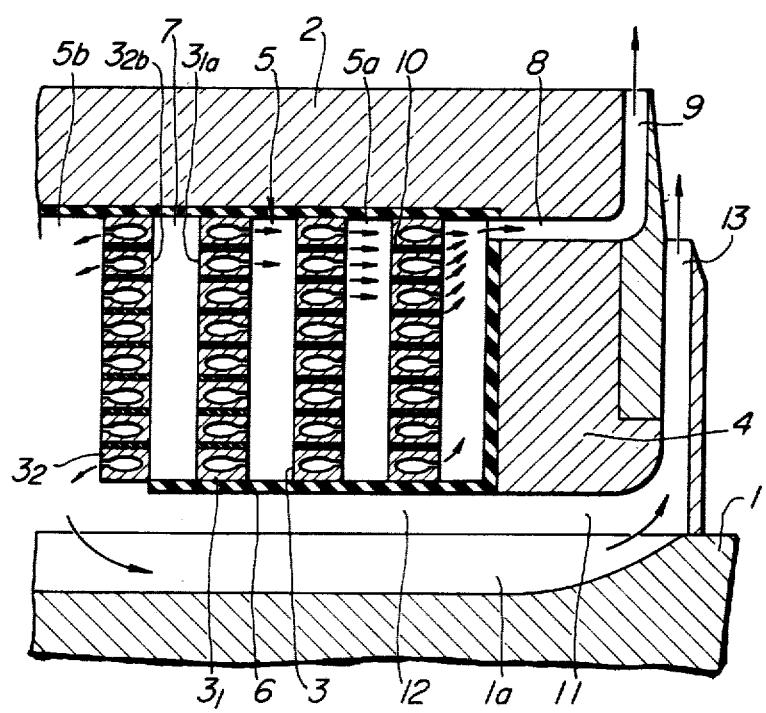
FIG. 1 is a sectional view of the structure of a rotor of a conventional gas-cooled rotary electric machine in the polar axis of the end of the rotor.

FIG. 1 is a sectional view of the structure of the rotor end of a conventional gas-cooled rotary electric machine in the polar axis. As shown in the drawing, a gas outlet portion in the polar axis of the rotor end includes a rotor shaft 1, a retaining ring 2, a multiplicity of laminated windings 3 including windings laminated disposed radially of the rotor, and a center ring 4 secured to the retaining ring 2. A gas outlet chamber 5 in the polar axis is divided into a first zone 5a and a second zone 5b by an L-shaped insulating spacer 6 and two circumferentially extending segmental insulating spacers 7 disposed in position between the laminated windings 3. The rotor shaft 1 is formed with grooves (not shown) constituting a gas inlet port (not shown) and a plurality of grooves 1a circumferentially spaced from one another. The center ring 4 is formed at its outer periphery with a plurality of axially extending passages 8. The first zone 5a of the outlet chamber 5 communicates with first fan-like ventilating means 9 disposed at the side of the center ring 4 through the first axially extending passages 8. The ventilating means 9 has a plurality of discharge ports over the entire circumference thereof. A plurality of insulations 10 separating the windings 3 in the first zone 5a from one another, respectively are formed with a multiplicity of axially extending passages for passing therethrough gas flow axially of the outlet chamber 5. Formed on the side of the center ring 4 adjacent to the rotor shaft 1 are a plurality of second axially extending passages 11 for maintaining the second zone 5b of the outlet chamber 5 in communication with second fan-like ventilating means 13 having a plurality of discharge ports in an arcuate portion of the center ring 4. Thus gas is introduced through the gas inlet port into channels in conductors of the laminated windings 3 to cool the latter. Then the gas flows toward the first zone 5a and second zone 5b of the outlet chamber 5. The gas which has been discharged from the channels in the conductors of the laminated windings 3 to the first zone 5a of the outlet chamber 5 flows through the axially extending passages in the insulation 10 and the first axially extending passages 8 to the first fan-like ventilating means 9 to be discharged outside the rotor. The cooling gas fed to the second zone 5b flows through gaps (12) and the second axially extending passages 11 to the second fan-like ventilating means 13 to be discharged outside the rotor.

In the prior art rotor as shown in FIG. 1, the gas fed to the first zone 5a of the outlet chamber 5 is led to the first fan-like ventilating means 9 through the axially extending passages formed in the insulations 10 which serve to separate the laminated windings 3 from one another. The insulations 10 are of a very small thickness, so that it is difficult to make the sizes of the axially directed passages sufficiently large. Thus the axially extending passages formed in the insulations 10 offer very great resistance to the gas flow, thereby markedly restricting the flow rate of gas passing therethrough to the first axially extending passages 8. This tendency is developed as it comes to insulations 10 disposed away from the center ring 4, so that uniform cooling of the windings can not be attained thereby to cause a temperature rise of the rotor to locally occur.

The plurality of circumferentially extending insulating spacers 7 are disposed in abutting relation with sides $3_{1a}$ and $3_{2b}$ of the laminated windings $3_1$ and $3_2$, respectively. The heat developed in the windings is partly carried away by gas flow through the channels in the conductors of the windings, but a substantial part of such heat is dissipated through the outer surfaces of the windings to gas flow. Thus the arrangement in which the sides $3_{1a}$ and $3_{2b}$ of the laminated windings $3_1$ and $3_2$ respectively are covered by the insulating spacers 7 makes it impossible for such heat to be dissipated therethrough and causes a local temperature rise in the laminated windings $3_1$ and $3_2$.

FIGS. 2-6 show a rotor for hydrogen-cooled rotary electric machines according to an embodiment of the invention. In the drawings, parts similar to those shown in FIG. 1 are designated by like reference numerals.

Figure 2:
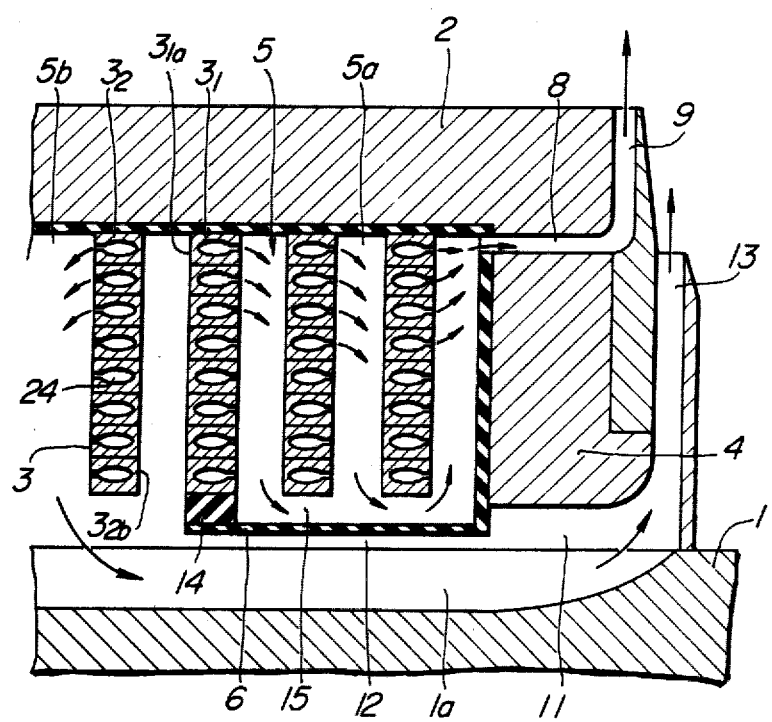
FIGS. 2-6 are views illustrating a rotor of the hydrogen-cooled rotary electric machine according to the invention, FIG. 2 being a sectional view of the structure of the rotor in the polar axis of the end of the rotor, FIG. 3 being a sectional view of the structure of the rotor in the interpolar axis of the end of the rotor, FIG. 4 being a planar development showing the end of the rotor extending from its polar axis to its interpolar axis, FIG. 5 being a perspective view of the end of the rotor and FIG. 6 being a view showing the direction of gas flow between the laminated windings.

FIG. 2 shows the structure of a gas discharge area of the rotor end according to the invention in the polar axis. Laminated windings $3_1$ of the multiplicity of laminated windings 3 mount thereto a circumferentially extending segmental partition wall 14 which underlies and contacts the lowermost winding of the laminated windings $3_1$. The outlet chamber 5 located near the polar axis is divided into first and second zones 5a and 5b by a circumferentially extending partition wall 14 and a L-shaped insulating spacer 6. The first zone 5 communicates through a space 15 defined between the undersurfaces of the laminated windings 3 and the L-shaped insulating spacer 6 and a plurality of first axially extending passages 8 formed on the outer peripheral side of the center ring 4 with first fan-like ventilating means 9. The second zone 5b communicates through a gap 12 defined between the L-shaped insulating spacer 6 and a plurality of grooves 1a formed in the rotor shaft 1 and a plurality of second axially extending passages 11 formed in the inner surface of the center ring 4 with second fan-like ventilating means 13 formed on the side of the center ring 4.

Figure 3:
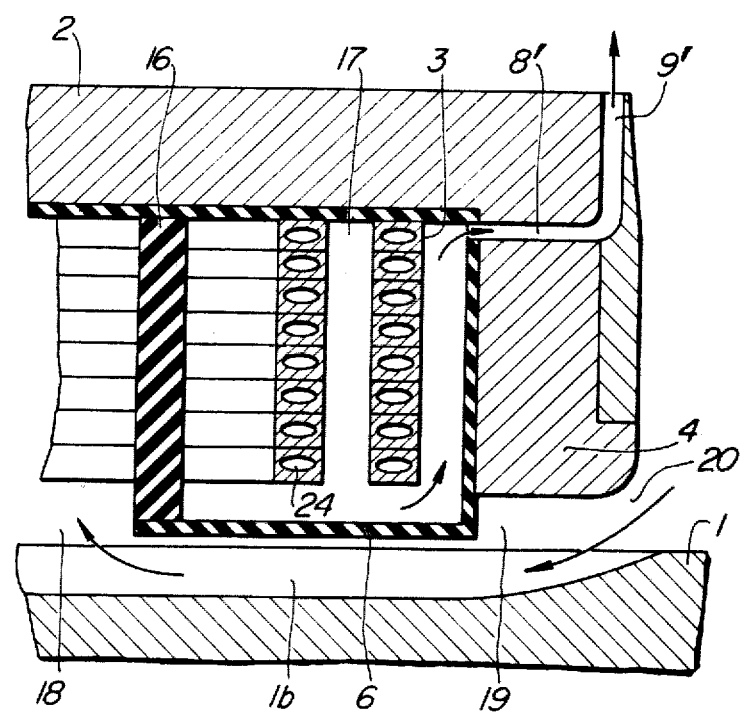

FIG. 3 shows a structure of gas inlet and outlet areas of the rotor end of the invention near the interpolar axis. A third zone 17 of the outlet chamber defined by the L-shaped insulating spacer 6 and a partition wall 16 communicates through first axially extending passages 8' with first fan-like ventilating means 9'. A gas inlet chamber 18 disposed in a region between the retaining ring 2 and rotor shaft 1 is separated from the gas outlet chamber by radially extending partition walls 23 and 16 (see FIG. 4). The gas inlet chamber 18 communicates with a gas inlet port 20 through a plurality of grooves 1b formed in the rotor shaft 1 and disposed circumferentially in spaced relation to the grooves 1a and through a third axially extending passages 19 formed on the inner surface of the center ring 4.

Figure 4:
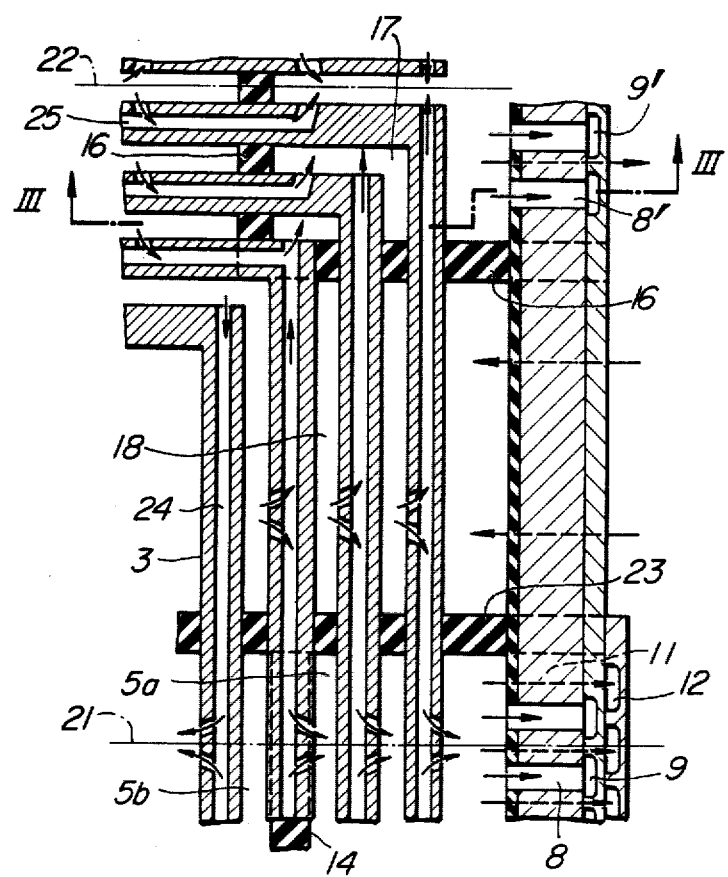

FIG. 4 is a planar development showing an arrangement of the windings showing extending from a polar axis 21 of the end of the rotor to a interpolar axis 22 thereof. The gas inlet chamber 18 is circumferentially separated from the gas outlet chamber by partition walls 16 and 23. FIG. 3 is a sectional view taken along the line IV—IV in FIG. 4.

Figure 5:
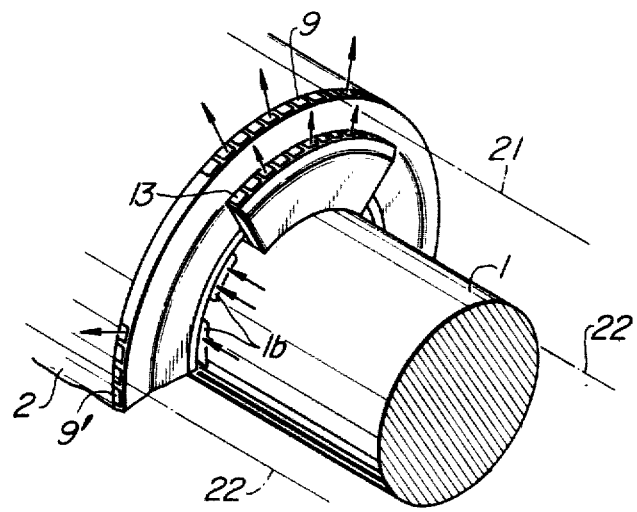
Figure 6:
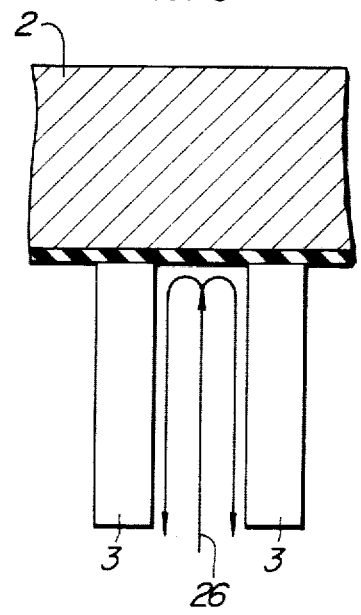

FIG. 5 is a perspective view of the rotor end shown in FIGS. 2-4, showing the gas inlet and outlet areas.

In the rotor structure according to the invention shown in FIGS. 2-5, gas is introduced from the gas inlet port 20 through the third axially extending passages 19 into the inlet chamber 18 bounded by the partition walls 16 and 23. Part of the gas introduced into the inlet chamber 18 flows into circumferentially extending channels 24 in the conductors of the windings of the laminated windings 3 to cool the same, and then flows toward the first and second zones 5a and 5b of the outlet chamber 5. The remainder of the gas flows through the circumferentially extending channels 24 or axially extending channels 25 in the conductors of the windings of the laminated windings 3 to cool the laminated windings 3. Thereafter the gas flows toward the third zone 17 of the outlet chamber near the interpolar axis 22. The gas entering the first zone 5a and the third zone 17 of the outlet chamber 5 is discharged through the first axially extending passages 8 and 8' to the first fan-like ventilating means 9 and 9' to the outside of the rotor. The gas entering the second zone 5b of the outlet chamber 5 flows through the second axially extending passages 11 and the second fan-like ventilating means 13 to be discharged outside of the rotor.

Due to the fact that the circumferentially extending partition wall 14 is secured to the underside of the lowermost winding of the laminated windings 3, the gas flows in contact with the entire outer surfaces of the laminated windings 3. The gas flowing between the laminated windings 3 in the first zone 5a of the outlet chamber 5 flows in a manner to form a thermosiphon as shown at 26 in FIG. 6 due to the existence of the L-shaped insulating spacer 6 and circumferentially extending partition wall 14. In the discharge passages leading from the second zone 5b of the outlet chamber 5 to the second fan-like ventilating means 13, the gap 12 between the L-shaped insulating spacer 6 and the grooves 1a formed in the rotor shaft 1 is narrower than that in the prior art rotors. However, the flow resistance in the discharge passages accounts for a small part of the entire flow resistance. As a result, the amount of gas discharged from the second fan-like ventilating means 13 is substantially the same with the prior art rotors.

From the foregoing description, it will be appreciated that in the rotor for gas-cooled rotary electric machines according to the invention, the flow resistance is greatly reduced due to the arrangement in which the discharge passages communicating the first zone of the gas outlet chamber with the first fan-like ventilating means are formed in a space between the laminated windings and the L-shaped insulating spacer. Therefore, the flow rate of cooling gas is greatly increased. Also, the circumferentially extending partition wall underlies the laminated windings, so that the outer surfaces of the laminated windings come into contact with the gas flow, thereby promoting heat dissipation therefrom. The provision of the L-shaped insulating spacer and the circumferentially extending partition wall facilitates effectively utilizing the thermosiphon effect of the gas flow between the laminated windings.

What is claimed is:

1. A rotor for hydrogen-cooled electric machines comprising:
    a rotor shaft;
    a plurality of rotor windings disposed about said rotor shaft;
    a retaining ring for holding said rotor windings in position on said rotor shaft;
    a center ring secured to said retaining ring;
    gas inlet and outlet chambers circumferentially defined by said center ring and radially extending partition walls and disposed in a region between said rotor shaft and said retaining ring;
    a plurality of fan-like ventilating means disposed on the outer side of the rotor end for discharging outside of the rotor gases which are introduced from said gas inlet chamber through the rotor windings to cool the same and then flow into the gas outlet chamber; wherein the improvement comprises means including L-shaped insulating spacers and circumferentially extending partition walls mounted on the underside of the lowermost winding of selected laminated windings for dividing said gas outlet chamber into first and second zones located near the polar axis of the rotor and a third zone located near the interpolar axis thereof, said plurality of fan-like ventilating means including first fan-like ventilating means disposed on the outer side of said center ring for discharging gases from said first and third zones of said gas outlet chamber and second fan-like ventilating means for discharging gases from said second zone of said gas outlet chamber.

2. A rotor according to claim 1, wherein said L-shaped insulating spacers are spaced from the undersurfaces of said rotor windings to permit gas to flow around said windings toward said fan-like ventilating means.

3. A rotor according to claim 2, wherein said L-shaped insulating spacers are spaced from said rotor so as to define a passage with said rotor through which gas from said second zone of said gas outlet chamber may flow toward said fan-like ventilating means.

4. A rotor according to claim 3, wherein one of said circumferentially extending partition walls is disposed in substantial alignment with one of said rotor windings and contacts one end of an L-shaped insulating spacer to divide said first and second zones of said gas outlet chamber.

* * * * *